United States Patent Office 3,065,250
Patented Nov. 20, 1962

3,065,250
NITRILE-METAL CARBONYL COMPLEXES
Dewey R. Levering, Wilmington, Del., assignor to Hercules Powder Company, Wilmington, Del., a corporation of Delaware
No Drawing. Filed May 13, 1960, Ser. No. 28,841
26 Claims. (Cl. 260—429)

The present invention relates to new and useful nitrile-metal carbonyl complexes and to the method of their preparation. More specifically, the invention relates to nitrile-metal carbonyl complexes where the metal is a group VI–B metal (chromium, molybdenum or tungsten) according to the periodic system (see Lange's Handbook of Chemistry, eighth edition, pages 56–57, 1952).

Some hydrogen cyanide-metal carbonyl complexes have been reported. However, complexes of hydrogen cyanide and a group VI–B metal carbonyl have never been reported, and attempts to prepare them have been unsuccessful. The present invention is based on the unforeseen discovery that nitriles undergo a general reaction with group VI–B metal carbonyls to form new and useful nitrile-metal carbonyl complexes, which result from the replacement of one or more carbonyl groups of the metal carbonyl by the nitrile.

More particularly, the present invention relates to crystalline, yellow to orange complexes of a nitrile and a group VI–B metal carbonyl, said complexes having the general formula $$[R(CN)_x]_n[M(CO)_y]_z$$

in which R is a hydrocarbon radical or a hydrocarbon radical containing as a substituent a nucleophilic group, i.e., a group that increases the electron availability in the triple bond region of the nitrile group, M is a hexacoordinated atom of a metal of group VI–B of the periodic table, $x$ is an integer from 1 to 2 inclusive, $n$ is an integer from 1 to 3 inclusive, $y$ is an integer from 2 to 5 inclusive and $z$ is an integer from 1 to 2 inclusive, and to the method of preparing such complexes which comprises either (1) reacting a group VI–B metal carbonyl $[M(CO)_6]$ with a nitrile having the formula $R(CN)_x$ where R and $x$ are as above defined, under conditions where carbon monoxide is removed as it is formed or (2) reacting a preformed nitrile-metal carbonyl complex having the general formula $$[R'(CN)_x]_n[M(CO)_y]_z$$

in which M, $x$, $n$, $y$ and $z$ are as above defined and R' is a hydrocarbon radical or a hydrocarbon radical containing as a substituent a nucleophilic group, with a nitrile having the formula $R(CN)_x$ where R and $x$ are as above defined, thereby replacing the nitrile component of the complex with another nitrile component.

Before describing the invention in greater detail, the following examples are presented for purpose of illustration, parts and percentages being by weight unless otherwise specified.

EXAMPLE 1

A reaction vessel fitted with a condenser and means to measure the amount of carbon monoxide evolved was charged with 5.2 parts of molbdenum carbonyl and flushed with nitrogen. Then 78.3 parts of dry acetonitrile were added and the reaction mixture refluxed at a temperature of 80°–81° C. for 3 hours, carbon monoxide being evolved the whole time, approximately 3 moles of carbon monoxide being evolved per mole of molybdenum carbonyl. The solution became yellow soon after the mixture began to reflux and all of the molybdenum carbonyl dissolved. After removing the excess acetonitrile under vacuum at room temperature, there remained 5.8 parts of a yellow crystalline solid which was very unstable in air, becoming brown immediately upon contact with air.

A sample of the product was analyzed under an inert atmosphere for percent carbon, hydrogen, nitrogen and molybdenum. The results of the analysis compared with the theoretical percentages for $(CH_3CN)_3Mo(CO)_3$ are tabulated below.

|  | Found | Theory |
|---|---|---|
| Percent C | 35.4 | 35.66 |
| Percent H | 2.74 | 3.0 |
| Percent N | 12.35 | 13.92 |
| Percent Mo | 32.6 | 31.65 |

The product was identified as $(CH_3CN)_3Mo(CO)_3$ which is in agreement with the evolution of three moles of carbon monoxide per mole of molybdenum carbonyl.

The product was insoluble in benzene, carbon tetrachloride, and water; somewhat soluble in methanol; and soluble in acetonitrile, ethylene glycol dimethyl ether, tetrahydrofuran and dimethylformamide.

The infrared spectra of the product was obtained and found to be greatly different from the spectra of $Mo(CO)_6$. In both cases the determinations were made in acetonitrile.

It was found that when the exact same reaction was attempted under identical conditions in a sealed reaction vessel, thereby preventing the release of carbon monoxide, the acetonitrile and molybdenum carbonyl remained unchanged.

EXAMPLE 2

This example shows that the reaction between the metal carbonyl and nitrile is an equilibrium reaction and can be readily reversed by a small partial pressure of carbon monoxide.

A sample of an acetonitrile-molybdenum carbonyl complex (described in Example 1) in cyclohexane solution was placed in a stainless steel autoclave in the absence of air. The autoclave was flushed with carbon monoxide, and the complex was allowed to react at 3000 p.s.i.g. carbon monoxide pressure at a temperature of 80° C. for 6 hours. On cooling molybdenum carbonyl and acetonitrile were recovered.

EXAMPLE 3

A reaction was conducted as in Example 1 using 5.2 parts of molybdenum carbonyl, 7.8 parts of acetonitrile and 68.4 parts of n-heptane reaction medium. After 13 hours at a reflux temperature of 72°–74° C. the evolution of carbon monoxide ceased indicating the completion of the reaction. Approximately three moles of carbon monoxide were evolved per mole of molybdenum carbonyl. During the reaction period, the reaction medium became yellow in color and a bright yellow crystalline solid precipitated. The solid was isolated by filtration in the absence of air. The product was identified as $$(CH_3CN)_3Mo(CO)_3$$

The results of an elementary analysis are tabulated below.

|  | Found | Theory |
|---|---|---|
| Percent C | 37.78 | 35.66 |
| Percent H | 2.98 | 3.0 |
| Percent N | 13.02 | 13.92 |

EXAMPLE 4

A reaction was conducted as in Example 1 using 5.2 parts of molybdenum carbonyl, 7.8 parts of acetonitrile and 39.6 parts of methanol as diluent. The reaction mixture was refluxed for 5 hours at a temperature of 65° C. with evolution of carbon monoxide. A light yellow solution resulted, and after evaporation of the solvent under vacuum, a yellow crystalline solid, identical to the complex described in Example 1, was obtained.

EXAMPLE 5

A reaction vessel fitted with a condenser and means to measure the amount of carbon monoxide evolved was charged with 15.6 parts of molybdenum carbonyl and flushed with nitrogen. Then 30 parts of benzonitrile in 68.4 parts of n-heptane were added and the reaction mixture refluxed at a temperature of 101–102° C. for 14 hours. Carbon monoxide equivalent to 3.06 moles per mole of molybdenum carbonyl was evolved. During the reaction a yellow crystalline solid precipitated and was isolated by filtration in the absence of air. The product was identified as $(C_6H_5CN)_3Mo(CO)_3$. The results of an elementary analysis were as follows:

|           | Found | Theory |
|-----------|-------|--------|
| Percent C | 58.69 | 58.90  |
| Percent H | 3.18  | 3.09   |
| Percent N | 8.41  | 8.60   |
| Percent Mo| 20.67 | 19.64  |

EXAMPLE 6

Molybdenum carbonyl (5.2 parts) was charged to a reaction vessel as described in Example 1. Then 9.5 parts of adiponitrile dissolved in 68.4 parts of heptane were added and the reaction mixture refluxed at a temperature of 100°–101° C. for about 23 hours. During this time, an amount of carbon monoxide equivalent to 3.1 moles per mole of molybdenum carbonyl was evolved. The reaction mixture separated into two phases during the reaction, the lower phase of which crystallized on cooling. A yellow crystalline product was removed by filtration in the absence of air. The product was identified as $[NC(CH_2)_4CN]_3Mo(CO)_3$. The results of an elementary analysis were as follows:

|           | Found | Theory |
|-----------|-------|--------|
| Percent C | 50.87 | 50.00  |
| Percent H | 4.63  | 4.79   |
| Percent N | 17.93 | 16.66  |

EXAMPLE 7

A reaction was conducted exactly as in Example 6 except the amount of adiponitrile reactant was reduced to 3.2 parts. Carbon monoxide evolution ceased after 11 hours and a light yellow crystalline solid was isolated from the lower phase of the reaction mixture. The product was identified as $$(CO)_3Mo[NC(CH_2)_4CN]_3Mo(CO)_3$$

The results of an elementary analysis were as follows:

|           | Found | Theory |
|-----------|-------|--------|
| Percent C | 42.02 | 42.12  |
| Percent H | 3.26  | 3.53   |
| Percent N | 11.03 | 12.28  |
| Percent Mo| 26.48 | 28.04  |

EXAMPLE 8

A reaction was conducted as in Example 1 using 5.2 parts of molybdenum carbonyl, 7.8 parts of propionitrile and 68.4 parts of heptane reaction medium. After refluxing at a temperature of 88°–90° C. for 9 hours, the evolution of carbon monoxide became very slow and the reaction was stopped. The total carbon monoxide evolved amounted to approximately two moles per mole of molybdenum carbonyl. The reaction mixture consisted of two liquid phases. On cooling the lower phase crystallized and a light yellow crystalline solid was isolated by filtration in the absence of air. The product was identified as $(CH_3CH_2CN)_2Mo(CO)_4$. The results of an elementary analysis were as follows:

|           | Found | Theory |
|-----------|-------|--------|
| Percent C | 35.5  | 37.75  |
| Percent H | 3.08  | 3.17   |
| Percent N | 8.55  | 8.80   |
| Percent Mo| 32.78 | 30.16  |

EXAMPLE 9

In another experiment conducted in the same manner as Example 8, 15 parts of n-capronitrile was substituted for the propionitrile. Refluxing was conducted at a temperature of 101° C. A brownish yellow crystalline product was obtained and exhibited an infrared spectra typical of a nitrile-molybdenum carbonyl complex.

EXAMPLE 10

A reaction was conducted as in Example 1 using 5.2 parts of molybdenum carbonyl, 11.7 parts of p-methylbenzoinitrile and 68.4 parts of heptane as the reaction medium. After refluxing at a temperature of 101° C. for 9 hours, the reaction was stopped. Carbon monoxide equivalent to 2.1 moles per mole of molybdenum carbonyl was evolved. During the reaction a golden crystalline solid precipitated and was isolated by filtration in the absence of air. The product was identified as $$(CH_3C_6H_4CN)_2Mo(CO)_4$$

The results of an elementary analysis were as follows:

|           | Found | Theory |
|-----------|-------|--------|
| Percent C | 54.18 | 53.34  |
| Percent H | 3.32  | 3.13   |
| Percent N | 6.19  | 6.22   |
| Percent Mo| 22.2  | 21.33  |

EXAMPLE 11

A reaction was conducted as in Example 1 using 5.2 parts of molybdenum carbonyl, 8.0 parts of acrylonitrile and 68.4 parts of heptane as the reaction medium. After refluxing at a temperature of 100° C. for 14 hours, the evolution of carbon monoxide practically ceased and the reaction was stopped. During this time the reaction medium became yellow in color and an orange crystalline solid precipitated. This crystalline solid was recovered by filtration in the absence of air. Infrared analysis of a sample of the crystalline solid failed to disclose the presence of unsaturation. Another sample was analyzed for percentage carbon, hydrogen, nitrogen and molybdenum. The results of the analysis compared with the theoretical percentages for $(CH_2=CHCN)_2Mo(CO)_2$ are tabulated below:

|           | Found | Theory |
|-----------|-------|--------|
| Percent C | 39.59 | 37.27  |
| Percent H | 2.85  | 2.34   |
| Percent N | 10.51 | 10.86  |
| Percent Mo| 34.44 | 37.17  |

While the exact structure of this complex is unknown, the following structure is probable.

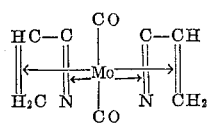

EXAMPLES 12–21

A series of reactions between various metal carbonyls and various nitriles was conducted by the same method as described in EXAMPLE 1. The metal carbonyl, nitrile, diluent (where one is used), reaction time, reaction temperature, moles of carbon monoxide evolved per mole of metal carbonyl used and the calculated number of carbonyl groups replaced are given in Table I.

remained dissolved throughout the hydrogenation reaction.

TABLE I

| Ex. No. | Metal carbonyl | Parts of carbonyl | Nitrile | Parts of nitrile | Diluent | Parts of diluent | Reaction time, hr. | Reaction temp., °C | Moles CO evolved/ mole carbonyl used | Number of carbonyl groups replaced | Color of crystalline complex |
|---|---|---|---|---|---|---|---|---|---|---|---|
| 12 | $Cr(CO)_6$ | 2.2 | Aceto | 39 | | | 25.5 | 82 | 3.0 | 3 | Light yellow. |
| 13 | $W(CO)_6$ | 3.5 | ___do___ | 39 | | | 21.5 | 84–85 | 2.6 | 3 | Greenish-yellow. |
| 14 | $Mo(CO)_6$ | 5.2 | Isobutyro | 79 | | | 7 | 104 | 2.4 | 2 | Yellow. |
| 15 | $Mo(CO)_6$ | 5.2 | Succino | 6 | Heptane | 68.4 | 12 | 101–102 | 2.7 | 3 | Greenish-yellow. |
| 16 | $Mo(CO)_6$ | 5.2 | Benzo | 2 | ___do___ | 68.4 | 7 | 100 | 0.5 | 1 | Deep yellow. |
| 17 | $Mo(CO)_6$ | 5.2 | 3-butene | 10 | ___do___ | 68.4 | 12.5 | 90–95 | 3.9 | 4 | Yellow. |
| 18 | $Mo(CO)_6$ | 5.2 | p-Chlorobenzo | 15 | ___do___ | 68.4 | 10.0 | 102 | 2.18 | 2 | Brilliant yellow. |
| 19 | $Mo(CO)_6$ | 5.2 | Cyanoacetamide | 3 | ___do___ | 68.4 | 10.5 | 99 | 1.9 | 2 | Yellow. |
| 20 | $Mo(CO)_6$ | 5.2 | Ethylcyanoacetamide | 10 | ___do___ | 68.4 | 12.6 | 105 | 2.5 | 3 | Do. |
| 21 | $Mo(CO)_6$ | 5.2 | p-Methoxybenzo | 13.3 | ___do___ | 68.4 | 12 | 100 | 2.9 | 3 | Light yellow. |

EXAMPLES 22–24

Three preparations were run in which nitrile-molybdenum carbonyl complexes were prepared by the displacement of acetonitrile with another nitrile. In each run a solution of acetonitrile-molybdenum carbonyl complex was prepared from 5.2 parts of molybdenum carbonyl and 78.3 parts of acetonitrile exactly as described in Example 1.

*Example 22.*—Benzonitrile (10 parts) was added to the first solution containing the acetonitrile complex at a temperature of 80°–81° C. The excess acetonitrile was removed under vacuum leaving a yellow crystalline solid which was identical with the crystalline solid prepared in Example 5.

*Example 23.*—n-Capronitrile (6 parts) was added to the second solution containing the acetonitrile complex at a temperature of 79°–80° C. The excess acetonitrile was removed under vacuum leaving a crystalline product identical to the product of Example 9.

*Example 24.*—Malononitrile (4 parts) was added to the third solution containing the acetonitrile complex at a temperature of 80°–82° C. The excess acetonitrile was removed under vacuum leaving a crystalline solid. Infrared analysis revealed that the solid was a malononitrile-molybdenum carbonyl complex.

EXAMPLE 25

This example shows the use of a complex of this invention as a catalyst in the hydrogenation of a nitrile.

An autoclave was charged to one half its volume with acetonitrile and flushed with nitrogen. Then an amount of $(CH_3CN)_3Mo(CO)_3$ (the acetonitrile-molybdenum carbonyl complex described in Example 1) equivalent to 7.5% by weight of the total reaction mixture was added under nitrogen atmosphere. The complex catalyst immediately went into solution. Next, the autoclave was evacuated and pressured to 4000 p.s.i. with hydrogen. After 4 hours at a temperature of 200° C., the reaction was cooled and the resulting solution fractionally distilled. The sole reaction product was triethylamine obtained at a conversion of 45%. The complex catalyst remained in solution throughout the hydrogenation.

EXAMPLE 26

A hydrogenation of benzonitrile to dibenzylamine was carried out under the same general conditions described in Example 25. However, the nitrile reactant was first diluted with an equal volume of isopropyl ether, and $(C_6H_5CN)_3Mo(CO)_3$ (the benzonitrile-molybdenum carbonyl complex described in Example 5) was used as the catalyst. The sole reaction product was dibenzylamine obtained at a conversion of 58%. The complex catalyst The complexes of this invention can be characterized by the general formula $$[R(CN)_x]_n[M(CO)_y]_z$$

where R, M, x, n, y and z are as previously defined. The relative values of n, x, y and z may vary considerably according to the nature of the nitrile employed in making the complex. Where, for instance, the nitrile is a saturated mononitrile, x and z are 1 and the sum of n and y is 6. Acetylenically unsaturated mononitriles behave similarly.

In the case of a dinitrile, x is, of course, 2 and the relative values of x, n, y and z are such that there is a total of at least 6 nitrile and carbonyl groups combined for each atom of metal. Thus, complexes having the respective general formulae $$(NC-R-CN)_nM(CO)_{6-n} \quad \text{(Example 6)}$$

and $$(CO)_{6-n}M(NC-R-CN)_nM(CO)_{6-n} \quad \text{(Example 7)}$$

can be made from dinitriles, the first formula representing the type of complex obtained when an excess of dinitrile is used as a reactant and the second formula representing the type obtained when an excess of metal carbonyl is employed.

In the preceding instances, the coordinate bonds are between the metal and the nitrile and carbonyl groups.

Olefinic nitriles, on the other hand, react with group VI–B metal carbonyls to form complexes in which each mole of nitrile replaces two carbonyl groups. The ostensible reason for this is that both the nitrile group and the olefinic bond are involved in the complex (see Example 11). In any event, in such complexes the total of nitrile groups, carbonyl groups and olefinic bonds is 6 per atom of metal.

In accordance with this invention, the nitrile-metal carbonyl complexes can be prepared of any nitrile-substituted hydrocarbon or of a nitrile-substituted hydrocarbon that contains a nucleophilic group, i.e., a group that increases the electron availability in the triple bond region of the nitrile group. Electrophilic groups, i.e., electron withdrawing groups, tend to decrease the ability of the nitrile to form these complexes. Thus, while alkyl, alkoxy and chloro-substituted aryl nitriles readily form these new complexes, nitro-substituted aryl nitriles do not, the nitro group being a strong electrophilic group. Thus, the nitrile can be a hydrocarbon nitrile, an oxyhydrocarbon nitrile, an alkoxyhydrocarbon nitrile, a nitrile-substituted aliphatic amide, a nitrile-substituted aliphatic ester, a halo-substituted aromatic nitrile, etc. Hence, R in the above formulae can be alkyl, alkenyl, alkynyl, cycloalkyl, cycloalkenyl, alkaryl, aralkyl, aryl, hydroxyalkyl, alkoxyalkyl, alkoxyaryl, haloaryl, carbamylalkyl, carbamylaryl, carbalkoxyalkyl, etc. Exemplary of the nitriles of which the new nitrile-metal carbonyl complexes of this invention can be prepared are nitrile-substituted hydrocarbons such as acetonitrile, propionitrile, n-butyronitrile, isobutyronitrile, n-valeronitrile, succinonitrile, adiponitrile, n-capronitrile, acrylonitrile, 3-butenenitrile, propiolonitrile, benzonitrile, p-toluonitrile, phenylacetonitrile, naphthonitrile, etc.; nitrile-substituted oxyhydrocarbons such as 3-hydroxy-butyronitrile, p-methoxy-benzonitrile, etc.; nitrile-substituted amides such as cyanoacetamide, etc.; nitrile-substituted esters such as ethylcyanoacetate, etc.; and halo-substituted aromatic nitriles such as p-chlorobenzonitrile, etc.

As demonstrated in the examples, the new nitrile-metal carbonyl complexes of this invention are prepared by either of two methods.
(A) The direct reaction of a nitrile with a group VI-B metal carbonyl.
(B) The displacement of a nitrile from a preformed nitrile-metal carbonyl complex with another nitrile.

A. Direct Method

Metal carbonyls of the group VI-B metals, i.e., molybdenum carbonyl, chromium carbonyl and tungsten carbonyl react with any of the nitriles defined above.

As shown in the examples, this reaction can be carried out in an inert liquid diluent or merely in an excess of the nitrile reactant. The latter procedure is preferable in case of liquid, high boiling nitriles because the complexes of this invention are soluble in nitriles but not in most other diluents. However, an inert diluent can be employed if the reaction is conducted at reflux temperature and the nitrile reactant would decompose the complex sought. Exemplary of inert diluents which can be employed are hydrocarbons such as n-heptane, n-hexane, n-octane, cyclohexane, etc., ethers such as di-isopropyl ether, dipropyl ether, diisobutyl ether, etc., and alcohols such as methanol, ethanol, isopropyl alcohol, etc.

The reaction between a nitrile and a group VI-B metal carbonyl is an equilibrium which is normally to the left but can be shifted in the direction of the formation of the complex by removal of carbon monoxide. Therefore, since the method of this invention is reversible, i.e. can easily be stopped or reversed by a small partial pressure of carbon monoxide, it must of necessity be conducted under conditions in which carbon monoxide is removed.

The reaction between the nitrile and the metal carbonyl is generally carried out by heating a mixture of the reactants to a temperature of from about 40° C. to about 140° C. at or about atmospheric pressure, while removing the by-product carbon monoxide as it is formed. Lower temperatures may be used but generally are not practical, unless the process is operated at reduced pressure, due to the slowness of the reaction at such temperatures. One of the simplest methods of carrying out the reaction is by refluxing the reaction mixture at atmospheric or near atmospheric pressure, whereby the carbon monoxide is removed as it is formed. Refluxing can be conducted over a range of temperatures up to about 140° C., at which temperature the complexes begin to decompose. The refluxing period will vary with various reactants, the temperature of the reflux, etc., but a sufficient period of time is readily ascertainable since the progress of the reaction is indicated by the amount of carbon monoxide evolved. Another method of conducting the reaction while removing carbon monoxide is by sparging the reaction mixture with an inert gas such as nitrogen.

Recovery of the nitrile-metal carbonyl complex from the reaction medium can be accomplished in a number of ways but because of its sensitivity to oxygen, the recovery must be carried out in the absence of air.

The number of nitrile molecules which appear in the final complex depends primarily upon the ratio of nitrile reactant to metal carbonyl. The number of metal carbonyl groups which appear in the final carbonyl complex depends upon the number of CN groups present on each nitrile compound since a mononitrile does not form a complex with more than one metal carbonyl. However, the ratio of dinitrile to metal carbonyl in the reaction mixture will effect the number of metal carbonyl groups appearing in the complex as shown in Examples 6 and 7.

B. Displacement or Indirect Method

The group or groups comprising the nitrile component of the nitrile-metal carbonyl complex of this invention can be displaced by another nitrile compound or compounds as shown in the equation

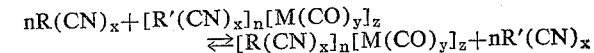
$$\rightleftarrows [R(CN)_x]_n[M(CO)_y]_z + nR'(CN)_x$$

where R, R', M, $x$, $n$, $y$ and $z$ are the same as defined above.

This reaction is also an equilibrium but can be forced to the right by either adding an excess of the $R(CN)_x$ or removing the $R'(CN)_x$, in cases where the latter is the more volatile nitrile, or by both means. For example, when a low boiling nitrile is displaced, such as acetonitrile, the reaction can be forced to completion by evaporation or distilling the lower boiling nitrile.

The displacement method of this invention can be conducted, in an inert diluent or in an excess of $R(CN)_x$, the nitrile reactant. The same inert solvents can be employed in this method as were employed in the direct method. Any reaction temperature below the lower of (1) the decomposition temperature of the complex being formed and (2) the decomposition temperature of the complex from which it is being formed can be used in this method. In general, the reaction will be carried out at a temperature below 140° C. Both the reaction and the recovery of the complex product are preferably carried out in the absence of air because of the sensitivity of the complex.

Exemplary of some of the nitrile-metal carbonyl complexes that can be prepared by this method of the invention are acetonitrile-molybdenum carbonyl, propionitrile-molybdenum carbonyl, isobutyronitrile-chromium carbonyl, benzonitrile-molybdenum carbonyl, benzonitrile-tungsten carbonyl, succinonitrile-molybdenum carbonyl, malononitrile-molybdenum carbonyl, etc.

The method used in the preparation of a desired complex depends on the properties of the specific reactants and the specific complex desired. While many of the nitrile-metal carbonyl complexes of this invention can easily be prepared by the direct method, others are more readily prepared by displacing the nitrile of an easily prepared complex.

There are, of course, still other indirect methods of preparing the complexes of this invention such as the displacement of an aromatic component of an aromatic-metal carbonyl complex with a nitrile or the displacement of an amine component of an amine-metal carbonyl complex with a nitrile. For example, either mesitylene-molybdenum tricarbonyl complex, pyridine-molybdenum tricarbonyl complex or n-butylamine-molybdenum tricarbonyl complex when treated with an excess of acetonitrile, yield the acetonitrile-molybdenum tricarbonyl complex of this invention.

The nitrile-metal carbonyl complexes of this invention are yellow to orange crystalline solids at room temperature which decompose on exposure to air, and exhibit distinctive infrared spectra. In general, they are soluble in most nitriles and to some extent in methanol, ethanol, tetrahydrofuran and the various glycol ethers but are essentially insoluble in other common solvents.

The complexes of this invention possess a variety of uses. They can, for example, be used for the homogeneous catalytic hydrogenation of nitriles to secondary or tertiary amines. By homogeneous hydrogenation is meant the catalyst is completely soluble in the reaction medium and stays in solution during the whole reaction.

Another example of the use of the complexes of this invention as catalysts is in the field of polymerization such as the polymerization of butadiene. Still another use is in the condensation of acetaldehyde and acetylene derivatives.

What I claim and desire to protect by Letters Patent is:

1. A crystalline complex of a nitrile and a group VI–B metal carbonyl, said complex having the general formula $$[R(CN)_x]_n[M(CO)_y]_z$$

in which R is a nucleophilic group selected from the class consisting of hydrocarbon groups, oxyhydrocarbon groups, alkoxyhydrocarbon groups, aliphatic amide groups, aliphatic ester groups, and halo-substituted aromatic hydrocarbon groups, M is a hexacoordinated metal of group VI–B of the periodic table, $x$ is an integer from 1 to 2 inclusive, $n$ is an integer from 1 to 3 inclusive, $y$ is an integer from 2 to 5 inclusive and $z$ is an integer from 1 to 2 inclusive, wherein $x$, $n$, $y$ and $z$ have one of the relationships selected from (a) $x$ and $z$ are each 1 and the sum of $n+y$ is 6, (b) $x$ and $z$ are each 1 and the sum of $n+y$ is 4 (c) $x$ is 2, $z$ is 1 and the sum of $n+y$ is 6, and (d) $x$ and $z$ are each 2 and the sum of $n+y$ is 6.

2. The complex of claim 1 wherein the metal is chromium.

3. The complex of claim 1 wherein the metal is molybdenum.

4. The complex of claim 1 wherein the metal is tungsten.

5. The complex of claim 1 wherein the nitrile is an aliphatic hydrocarbon nitrile.

6. The complex of claim 1 wherein the nitrile is an aromatic hydrocarbon nitrile.

7. The complex of claim 1 wherein the nitrile is an alkoxy-substituted aromatic hydrocarbon nitrile.

8. The complex of claim 1 wherein the nitrile is a chloro-substituted aromatic hydrocarbon nitrile.

9. The complex of claim 5 wherein the nitrile is acetonitrile.

10. An acetonitrile-molybdenum carbonyl complex having the formula $(CH_3CN)_3Mo(CO)_3$.

11. A benzonitrile-molybdenum carbonyl complex having the formula $(C_6H_5CN)_3Mo(CO)_3$.

12. An adiponitrile-molybdenum carbonyl complex having the formula $[NC(CH_2)_4CN]_3Mo(CO)_3$.

13. A propionitrile-molybdenum carbonyl complex having the formula $(C_2H_5CN)_2Mo(CO)_4$.

14. Acrylonitrile-molybdenum carbonyl complex having the formula $(CH_2=CHCN)_2Mo(CO)_2$.

15. The method of preparing a crystalline complex of a nitrile and a group VI–B metal which comprises reacting a metal carbonyl having the formula $M(CO)_6$ where M is a hexacoordinated metal of group VI–B of the periodic table with a nitrile having the formula $R(CN)_x$ where R is a nucleophilic group selected from the class consisting of hydrocarbon groups, oxyhydrocarbon groups, alkoxyhydrocarbon groups, aliphatic amide groups, aliphatic ester groups, and halo-substituted aromatic hydrocarbon groups, and $x$ is an integer from 1 to 2 inclusive under conditions where carbon monoxide is removed as it is formed.

16. The method of claim 15 wherein the metal is molybdenum.

17. The method of claim 15 wherein the nitrile is acetonitrile.

18. The method of claim 15 wherein the nitrile is benzonitrile.

19. The method of claim 15 wherein the nitrile is propionitrile.

20. The method of claim 15 wherein the nitrile is adiponitrile.

21. The method of claim 15 wherein the nitrile is acrylonitrile.

22. The method of preparing a crystalline complex of a nitrile and a group VI–B metal which comprises reacting a nitrile-metal carbonyl complex having the general formula $[R'(CN)_x]_n[M(CO)_y]_z$ in which R' is a nucleophilic group selected from the class consisting of hydrocarbon groups, oxyhydrocarbon groups, alkoxyhydrocarbon groups, aliphatic amide groups, aliphatic ester groups, and halo-substituted aromatic hydrocarbon groups, M is a hexacoordinated metal of group VI–B of the periodic table, $x$ is an integer from 1 to 2 inclusive, $n$ is an integer from 1 to 3 inclusive, $y$ is an integer from 2 to 5 inclusive and $z$ is an integer from 1 to 2 inclusive with a different nitrile from the nitrile component of said nitrile-metal carbonyl complex, said different nitrile having the formula $R(CN)_x$ where R is a nucleophilic group selected from the class consisting of hydrocarbon groups, oxyhydrocarbon groups, alkoxyhydrocarbon groups, aliphatic amide groups, aliphatic ester groups, and halo-substituted aromatic hydrocarbon groups, R being a different substituent group from R' and $x$ is an integer from 1 to 2 inclusive, thereby replacing the nitrile component of the complex with another nitrile component, $x$, $n$, $y$ and $z$ in said formula having one of the relationships selected from (a) $x$ and $z$ are each 1 and the sum of $n+y$ is 6, (b) $x$ and $z$ are each 1 and the sum of $n+y$ is 4, (c) $x$ is 2, $z$ is 1 and the sum of $n+y$ is 6, and (d) $x$ and $z$ are each 2 and the sum of $n+y$ is 6.

23. The method of claim 22 wherein said nitrile-metal carbonyl complex is an acetonitrile-molybdenum carbonyl complex.

24. The method of claim 23 wherein said different nitrile is benzonitrile.

25. The method of claim 23 wherein said different nitrile is capronitrile.

26. The method of claim 23 wherein said different nitrile is malononitrile.

References Cited in the file of this patent

Natta et al.: "La Chimica E L'Industria," vol. 40, No. 12, pp. 1003–1007, 1958.

Wertheim: "Organic Chemistry," third edition, McGraw Hill Book Co., Inc. (1951), p. 327 relied on.

Klages et al.: "Chemische Berichte," vol. 83, No. 6, October 1950, pp. 501–508 relied on.

Hieber et al.: "Chemische Berichte," vol. 89, No. 3, March 1956, pp. 616–619 relied on.

Huber: "Uber Neue, nicht-Salzartige, Komplexe des Molybdan (XI)," p. 32 relied on.